(12) United States Patent
Gee et al.

(10) Patent No.: US 7,662,021 B2
(45) Date of Patent: Feb. 16, 2010

(54) LAPPING PLATE TEXTURE FOR INCREASED CONTROL OVER ACTUAL LAPPING FORCE

(75) Inventors: Glenn P. Gee, San Jose, CA (US); Ferdinand Hendriks, Morgan Hill, CA (US); John P. Herber, Morgan Hill, CA (US); Darrick T. Smith, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 183 days.

(21) Appl. No.: 11/787,920

(22) Filed: Apr. 17, 2007

(65) Prior Publication Data

US 2008/0259492 A1    Oct. 23, 2008

(51) Int. Cl.
*B24B 49/00* (2006.01)
(52) U.S. Cl. .............................. 451/5; 451/41; 451/56; 451/273; 451/527
(58) Field of Classification Search ...................... 451/5, 451/11, 41, 56, 272, 273, 527
See application file for complete search history.

(56) References Cited

U.S. PATENT DOCUMENTS

| | | | |
|---|---|---|---|
| 4,607,458 A | 8/1986 | Lee | |
| 4,612,733 A | 9/1986 | Lee | |
| 4,627,195 A | 12/1986 | Greenleaf | |
| 4,866,886 A * | 9/1989 | Holmstrand | 51/307 |
| 5,591,073 A | 1/1997 | Turgeon | |
| 6,050,879 A * | 4/2000 | Dubrovskiy et al. | 451/36 |
| 6,102,777 A | 8/2000 | Duescher et al. | |
| 6,663,477 B1 | 12/2003 | Gee | |
| 6,802,761 B1 * | 10/2004 | Beaucage et al. | 451/28 |
| 7,410,410 B2 * | 8/2008 | Mahadev et al. | 451/56 |
| 2002/0035778 A1 | 3/2002 | Hashimoto et al. | |
| 2004/0185753 A1 * | 9/2004 | Beaucage et al. | 451/28 |
| 2005/0071986 A1 | 4/2005 | Lackey et al. | |
| 2006/0228996 A1 | 10/2006 | Biskeborn | |

FOREIGN PATENT DOCUMENTS

| | | |
|---|---|---|
| EP | 0504887 | 9/1992 |
| WO | WO-02069010 | 9/2002 |

* cited by examiner

*Primary Examiner*—Maurina Rachuba

(57) ABSTRACT

A slider lapping texture for implementation in a lapping environment. The slider lapping texture includes a lapping texture structure for utilization in a lapping process performed on a slider. The structure also includes a first surface having a base elevation. The structure further includes a second surface at an elevation higher than the base elevation. The second surface is for lapping the slider. The structure additionally includes an opening for expelling residue associated with a lapping process. The slider lapping texture is configured to generate an attractive force when the slider is motioned thereupon in a substantially unidirectional manner.

20 Claims, 13 Drawing Sheets

300

LAPPING PLATE TEXTURE FOR INCREASED CONTROL OVER ACTUAL LAPPING FORCE

TECHNICAL FIELD

The invention relates to the field of lapping textures and lapping processes.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly and reliably is the result of steady progress in the engineering disciplines of materials research, electrical engineering, computer science and servo-mechanics. Furthermore, the success of HDDs is highly dependent on sophisticated manufacturing techniques.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The head gimbal assembly (HGA) incorporates the head and the slider, mounted on the suspension. The slider is usually bonded to the end of the suspension.

A suspension has a spring-like quality, which biases or presses the air-bearing surface of the slider against the disk to cause the slider to fly at a precise distance from the disk with a large stiffness normal to the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

Besides increasing the number of bits per inch stored along a track, increasing the number of tracks per inch allows more data to be stored on the surface of the disk. The number of data tracks recorded on the surface of the disk is determined partly by how well, in the presence of mechanical and electrical disturbances, the read/write head on the slider can be positioned and made stable over a desired data track.

SUMMARY OF THE INVENTION

A lapping texture element is described. A slider lapping texture for implementation in a lapping environment. The slider lapping texture includes a lapping texture structure for utilization in a lapping process performed on a slider. The structure also includes a first surface having a base elevation. The structure further includes a second surface at an elevation higher than the base elevation. The second surface is for lapping the slider. The structure additionally includes an opening for expelling residue associated with a lapping process. The slider lapping texture is configured to generate an attractive force when the slider is motioned thereupon in a substantially unidirectional manner.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Figure 1:
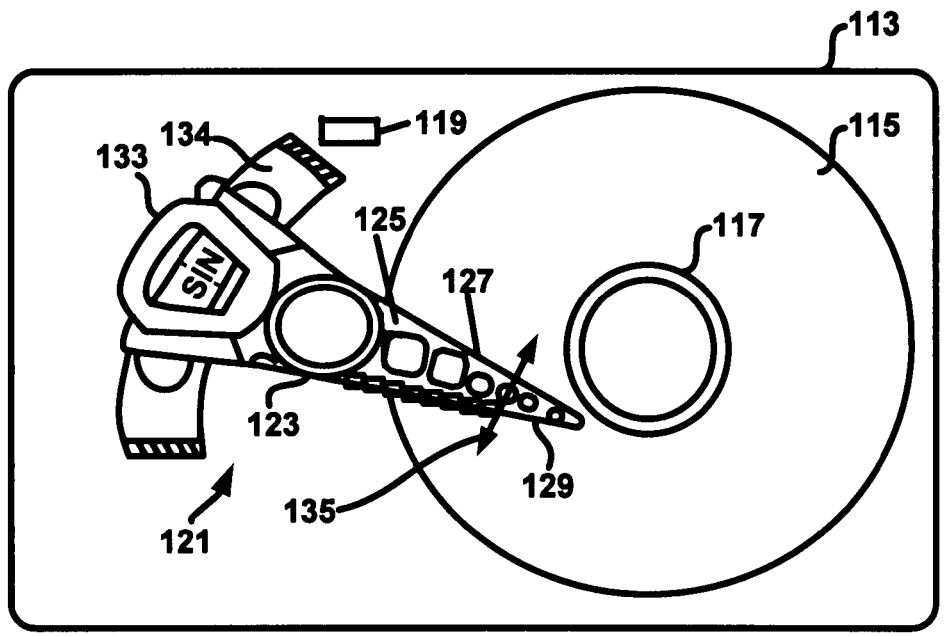
FIG. 1 is plan view of a hard disk drive (HDD) in accordance with an embodiment of the present invention.

With reference now to FIG. 1, a schematic drawing of an embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about an upper edge pivot assembly 123, as is currently shown. A controller 119 is also mounted to base 113 for selectively moving the comb of arms 125 relative to disk 115.

Figure 2:
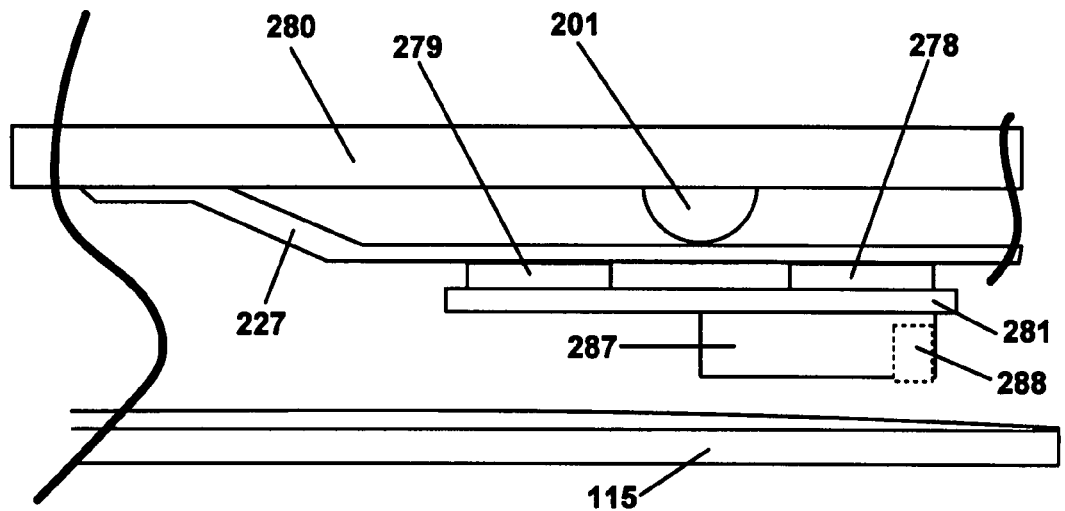
FIG. 2 is a profile view of a suspension assembly of FIG. 1, in an embodiment of the present invention.

In the embodiment shown, each arm 125 has extending from it at least one cantilevered electrical lead suspension (ELS) 127 (load beam, e.g., load beam 280 of FIG. 2, not shown). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD.

A magnetic read/write transducer or head is mounted on a slider 129 and secured to a flexure which is flexibly mounted to each ELS 127. The read/write heads magnetically read data from and/or magnetically write data to disk 115. The level of integration called the head gimbal assembly, e.g., HGA 226 of FIG. 2, is the head and the slider 129, which are mounted on suspension (also referred to as a flexure) 127 (FIG. 2). The slider 129 is usually bonded to the end of ELS 127

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

FIG. 2 is profile view of a portion of an HGA 226, which is an assembly of slider 129 and an ELS 127 of FIG. 1. It is noted that the components shown in HGA 226 are exemplary, meaning that fewer numbers of components or a greater number of components, and their respective characteristics and functions, may be incorporated in an HGA 226. In the exampled HGA 226, shown are a load beam 280, a loading dimple 201 and a flexure 227. One or more bonding pads 278 and 279 may provide a bonding surface for bonding a slider mounting plate 281 to flexure 227. Slider mounting plate 281 is shown to have coupled therewith a slider 287 having a read/write head 288 disposed therewithin. Read/write head 288 is for reading data from and writing data to a hard disk, e.g., hard disk 115.

Figure 3:
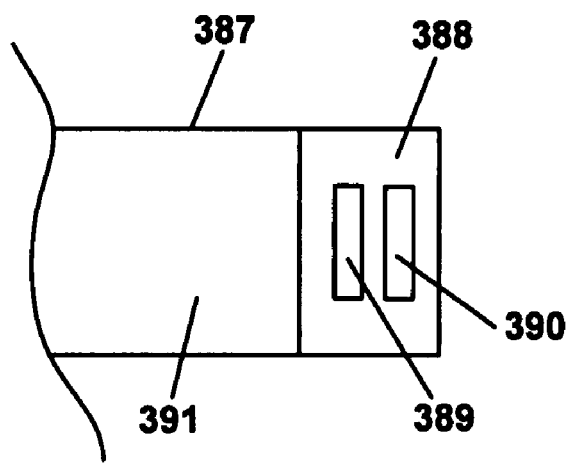
FIG. 3 is a bottom view of a transducer element, in accordance with an embodiment of the present invention.

FIG. 3 is a bottom view 300 of a slider 387, e.g., slider 287 of FIG. 2. Slider 387 includes a transducer 388. Transducer 388 is shown to include a write head 390, for writing data to a disk, e.g., disk 115 of FIGS. 1 and 2, and a read head 389 for reading data from a disk, e.g., disk 115 of FIGS. 1 and 2. Also shown on slider 387 is an air bearing surface 391. Air bearing surface 391 assists in controlling the fly height of slider 387 over disk 115 when in operation. Fly height is the distance between slider 387 and disk 115. In slider fabrication, a lapping process is implemented upon slider 387 for defining air bearing surface 387, read element 389 and write element 390.

Figure 4:
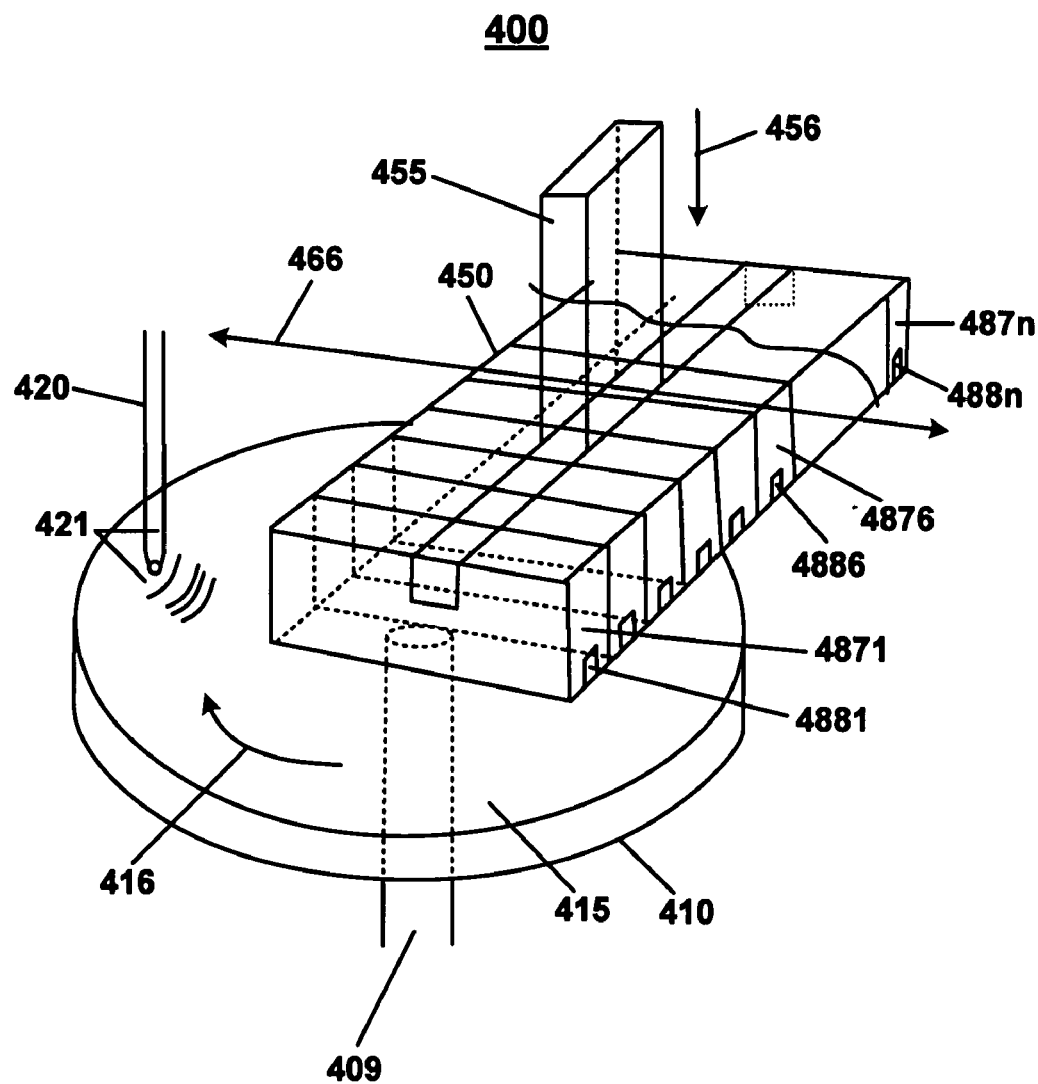
FIG. 4 is an isometric view of a lapping environment.

FIG. 4 is a profile view of an exemplary lapping environment 400 for lapping a slider assembly, e.g., slider 287 of FIG. 2 and slider 387 of FIG. 3. Environment 400 is shown to include a lapping mechanism 410. Mechanism 410, a lapping plate, is coupled to a spindle 409 for rotating mechanism 410, as indicated by arrow 416. Mechanism 410 includes a lapping surface 415 upon which is disposed an abrasive element. Diamond particles, suspended in a lapping fluid, are an example of an abrasive element, although alternative abrasives may also be implemented. Lapping mechanism 410 also includes a lapping nozzle 420 through which a lapping fluid 421 is disposed on surface 415 during the lapping process.

Environment 400 further includes a lapping holding fixture 455 for holding a slider row, e.g., slider row 450, during a lapping process performed thereon. Fixture 455 may use mechanical retention (shown) or adhesive components (not shown) to retain a slider row 450 during lapping, and is for applying a force upon slider row 450 such that slider row 450 contacts the abrasive surface 415 of lapping mechanism 410, as indicated by downward arrow 456. In general, the slider row also executes an oscillatory radial motion relative to spinning lapping plate 410. Although not shown in FIG. 4, it is particularly noted that spindle 409, nozzle 420 and slider row holder 455 are each controlled through one or more computer systems and/or controlling systems and/or software and firmware coupled therewith.

Still referring to FIG. 4, environment 400 additionally includes a slider row 450. Slider row 450 is a row of slider components 487 prior to dicing (separating individual sliders). Slider row 450 is shown to include a plurality of slider components 487$_1$-487$n$ having a like number of read/write elements 488$_1$-488$n$.

In the example environment 400, force 456, applied to slider row 450, affects the precise separation and interaction between slider row 450 and abrasive surface 415 of lapping mechanism 410. As mechanism 410 rotates (arrow 416), abrasive surface 415 reduces those portions of slider row 450 contacting surface 415. Debris from the lapping process, known as swarf, exits from the interface between surface 415 and slider row 450, and can cause fluctuations of the lapping process.

Figure 5A:
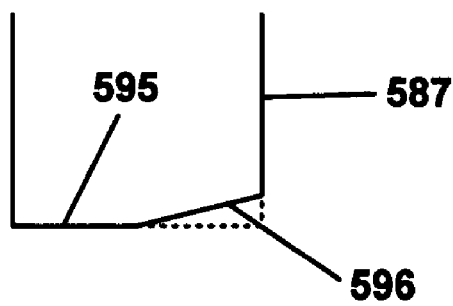
FIG. 5A is an illustration of a possible lapping result observed in the lapping environment of FIG. 4.

FIG. 5A is a block diagram illustrating an imperfection that can occur during a lapping process in an exemplary lapping environment, e.g., environment 400 of FIG. 4. Generally shown is a slider component 587 of a slider row, e.g., slider row 450 of FIG. 4. Slider component 587 shows a surface 596 having a facet 597, such that surface 596 is not substantially planar.

Figure 5B:
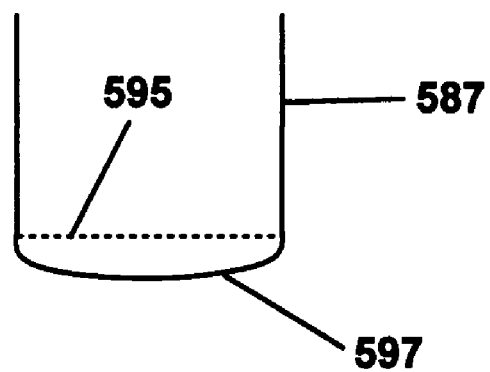
FIG. 5B is an illustration of another possible lapping result observed in the lapping environment of FIG. 4.

FIG. 5B is a block diagram illustrating another imperfection that can occur during a lapping process in a lapping environment, e.g., environment 400 of FIG. 4. Generally shown is a slider component 587 of a slider row, e.g., slider row 450 of FIG. 4. Slider component 587 shows a surface 596 having a positive crown 598, such that surface 596 is not substantially planar.

Figure 5C:
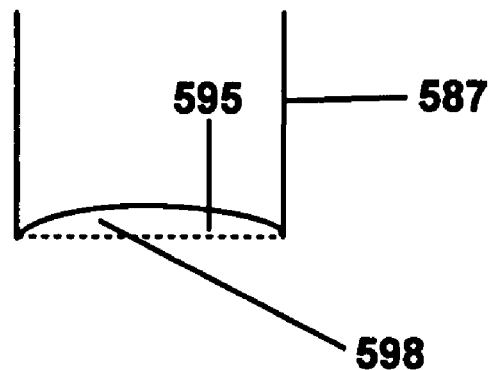
FIG. 5C is an illustration of yet another possible lapping result observed in the lapping environment of FIG. 4

FIG. 5C is a block diagram illustrating yet another imperfection that can occur during a lapping process in a lapping environment, e.g., environment 400 of FIG. 4. Generally shown is a slider component 587 of a slider row, e.g., slider row 450 of FIG. 4. Slider component 587 shows a surface 596 having a negative crown 599, such that surface 596 is not substantially planar.

Figure 5D:
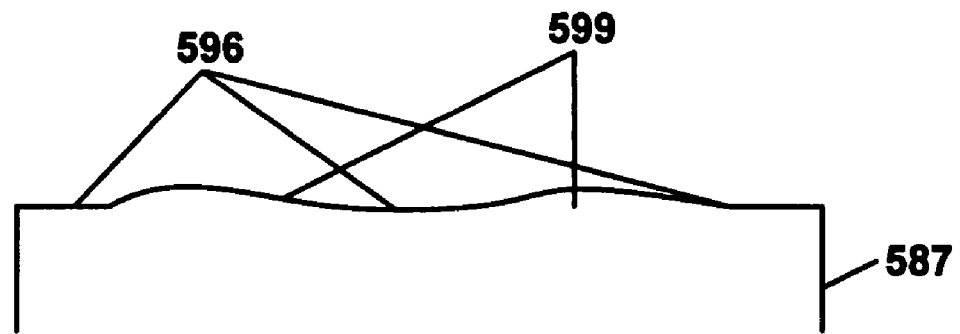
FIG. 5D is an illustration of still another possible lapping result observed in the lapping environment of FIG. 4.

FIG. 5D is a block diagram illustrating yet another imperfection that can occur during a lapping process in a lapping environment, e.g., environment 400 of FIG. 4. Generally shown is a slider component 587 of a slider row, e.g., slider row 450 of FIG. 4. Slider component 587 shows a surface 596 having a plurality of protrusions 599, indicating an occurrence of waviness such that surface 596 is not substantially planar.

Figure 6:
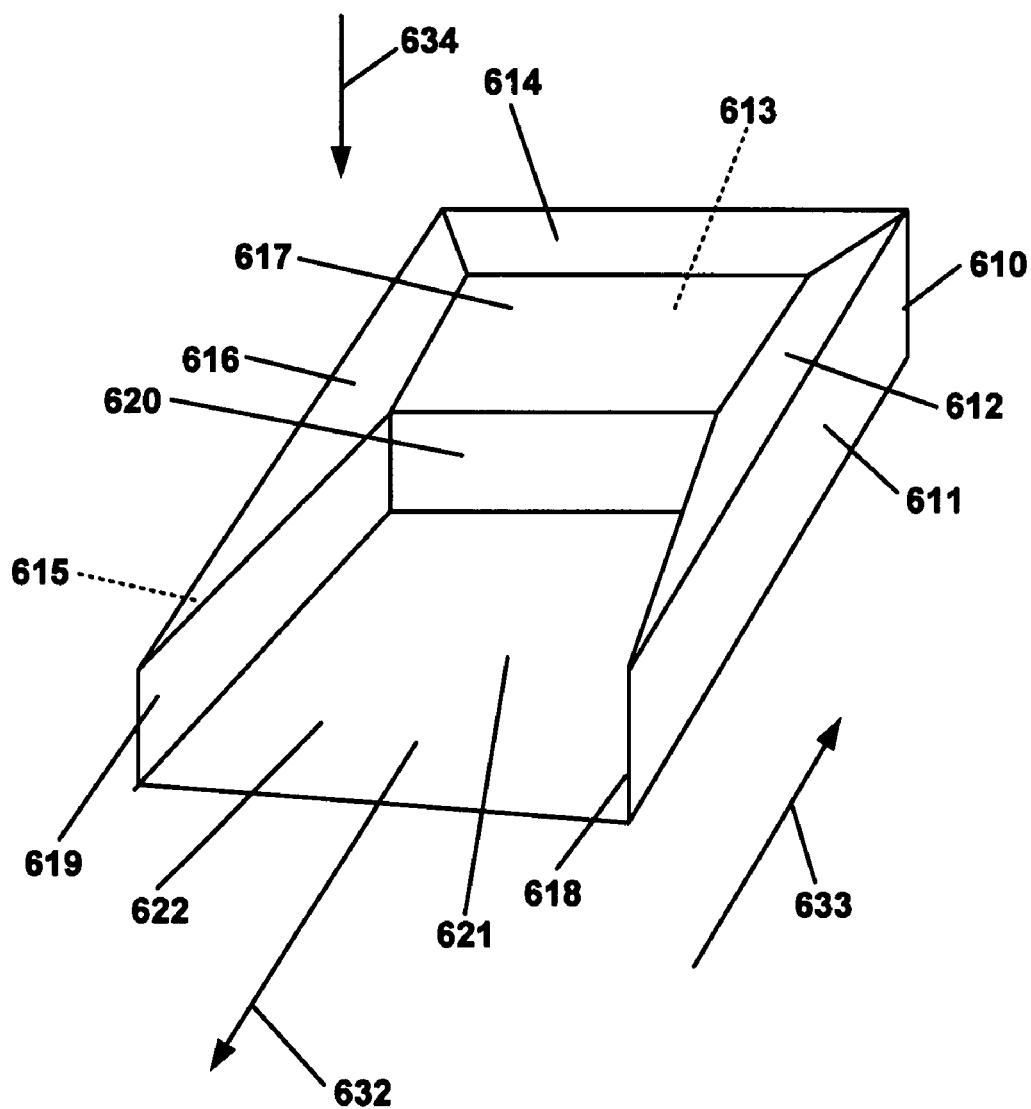
FIG. 6 is an oblique view of a lapping texture element in accordance with an embodiment of the present invention.

FIG. 6 is a lapping texture element 600 in accordance with an embodiment of the present invention. Lapping texture element 600 is configured for implementation in a lapping system, e.g., lapping system 800 of FIG. 8. Lapping texture element 600 includes a lapping element structure 610 that is shown to include a first side panel 611, a back panel 613 and a second side panel 615, in an embodiment of the present invention. Structure 610 further includes a first side inward facet 612, a back inward facet 614 and a second side inward facet 616, in an embodiment of the present invention.

Lapping element structure 610 additionally includes a surface 617 which, in an embodiment of the present invention, is configured with abrasive characteristics. Alternatively, facets 612, 614 and 616, as well as surface 617 may each be an abrasive surface. Structure 610 also includes a first internal side panel 618, an internal back panel 620, a second internal side panel 619 and a bottom surface 621, such that facets 612, 614, 616 and surface 617 are at an elevation higher that bottom surface 621, in accordance with an embodiment of the present invention. Further, by virtue of the facet and panel configuration as described with reference to FIG. 6, structure 610 is, in an embodiment of the present invention, configured as having an open end, e.g., opening 622 of structure 610 of FIG. 6.

Although embodiments of the present invention are presented in a structure elements having a rectangular shape, it is noted that alternative shapes, including, but which is not limited to, curved structures, angular structures, or combinations thereof, provided alternative shapes provide analogous functions to those described herein.

Figure 8:
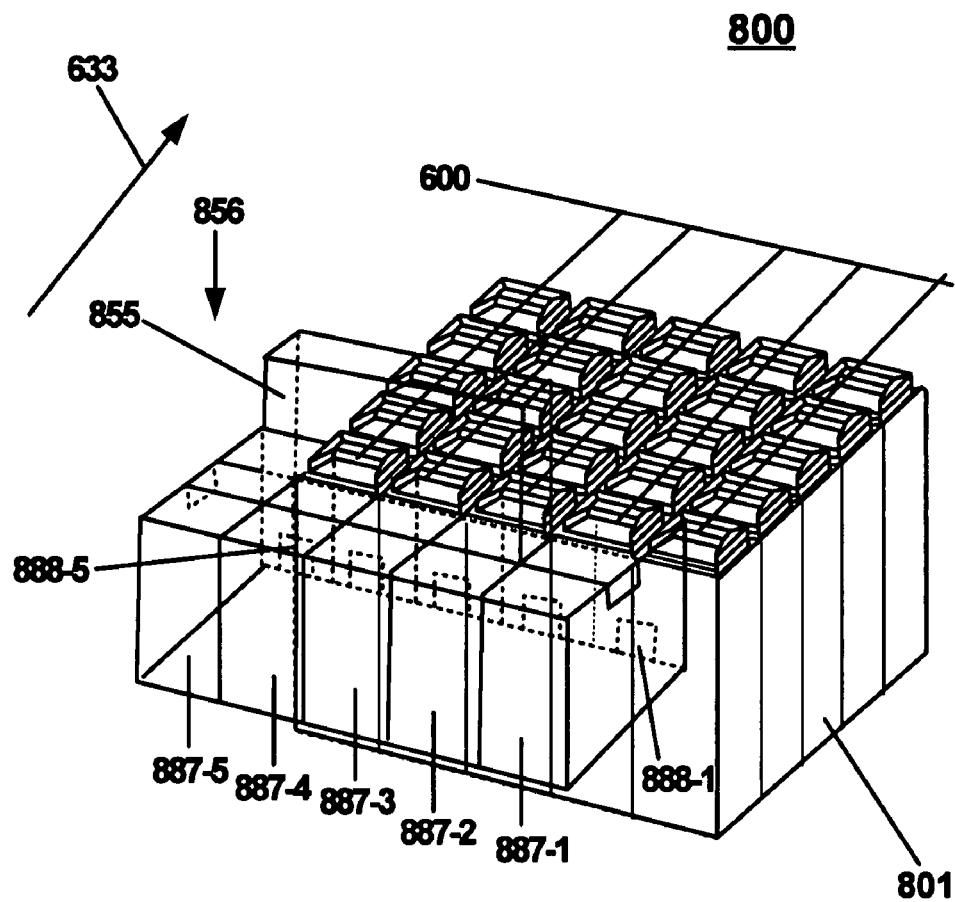
FIG. 8 is a plurality of lapping texture elements coupled to a multi-element lapping base structure in accordance with an embodiment of the present invention.

In an embodiment of the present invention, a slider row, e.g., slider row 850 of FIG. 8, is directionally motioned upon surface 617 of lapping texture element 600, as indicated by arrow 633.

It is noted that opening 622 of lapping texture element 600 is an egress for debris and lubricant associated with a lapping process. In an embodiment of the present invention, the volume of residue (slider debris and used lubricant) and force generated to expunge the residue through opening 622 during a lapping process, indicated as arrow 632, can be calculated and given a value. The value can be entered and integrated into a lapping process.

It is additionally noted that as a result of lapping texture structure having bi-elevated surfaces, opening 622 of lapping texture element 600 also generates a negative, relative to ambient, pressure effect. This effect draws the object, e.g., slider row 850, toward the lapping structure, indicated as arrow 634. The attractive force can be calculated and given a value. The value can be entered and integrated into a lapping process.

The values of residue expunging force 632 and slider row attractive force 634 can be utilized within the lapping process to realize an increase lapping pressure refineability. Through an efficient evacuation of debris, and providing a negative pressure effect, embodiments of the present invention achieve a reduction in the amount of pressure necessary for lapping. By virtue of decreased pressure requirements, decreased instances of faceting, crowning, and a finer lapping process can be achieved. A finer lapping process can increase the control and yield of the finished lapped parts.

Figure 7:
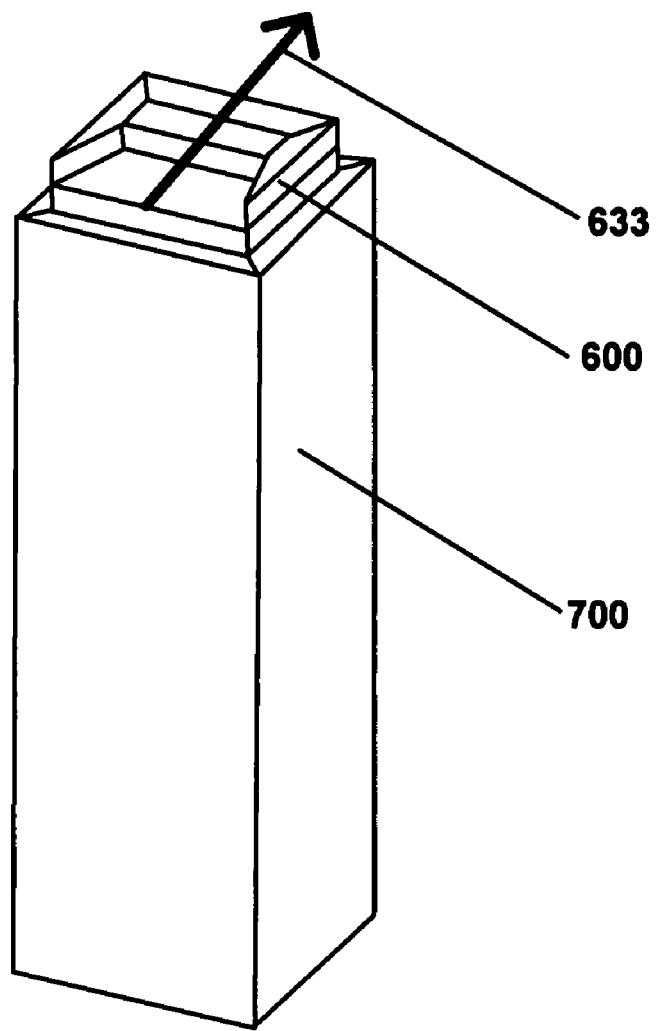
FIG. 7 is a lapping texture element coupled to a lapping element base structure in accordance with an embodiment of the present invention.

FIG. 7 is a front-angle view of a single lapping texture element 600 coupled to a base structure 700, in accordance with an embodiment of the present invention. Element 600 is coupled in a fixed position to base structure 700. During movement of a slider row, e.g., slider row 850 of FIG. 8, as directionally indicated by arrow 633, embodiments of the present invention generate negative lift, as described herein with reference to FIG. 6.

FIG. 8 is front-angle view of a lapping system 800, in accordance with an embodiment of the present invention. System 800 includes, in part, a controlling infrastructure (not shown), a multiple element base structure 801, configured as stationary, having a plurality of lapping texture elements 600 coupled thereto, in accordance with an embodiment of the present invention. Elements 600 are coupled in a fixed position to multiple element base structure 801. In the embodiment shown, elements 600 are shown in a multiple symmetric alignment, e.g., a 5×5 arrangement. Different arrangements, alignments and configurations may be implemented in alternative embodiments of the present invention.

System 800 of FIG. 8 further includes a slider row mover 855 for moving a slider row, e.g., slider row 850, during a lapping process, in an embodiment of the present invention. Slider row 850 is shown to include a plurality of sliders, e.g., sliders 887-1, 887-2, 887-3, 887-4 and 887-5. It is noted that each slider has disposed therein an associated read/write head, e.g., read/write head 888-1 of slider 887-1, and so on.

Mover 855 is, in an embodiment, configured to motion slider row 850 toward the direction as indicated by arrow 633. Mover 855 is, in an embodiment, further configured to apply a downward pressure on slider row 850, as indicated by arrow 856. It is noted that mover 855 may be shaped differently and may be differently configured, e.g., utilizing adhesives in lieu of mechanical retention, or a combination of mechanical retention and adhesives, to retain and moving a slider row 850, in alternative embodiments of the present invention.

In an embodiment of the present invention, mover 855 and base structure 801 can be configured to accommodate greater numbers of sliders in a slider row, e.g., slider row 850. Further, base structure 801 can be configured to have greater numbers or fewer numbers of lapping texture element 600 disposed thereon. Further, base structure 801 can, in an embodiment of the present invention, have a greater number or a fewer number of elements 600 than are in a slider row, e.g., slider row 850.

Multiple element base structure 800 provides analogous functions as base structure 700, as described herein with reference to FIG. 7. During movement of a slider row 850, directionally indicated by arrow 633, embodiments of the present invention generate negative lift, as described herein with reference to FIGS. 6 and 7.

Figure 9:
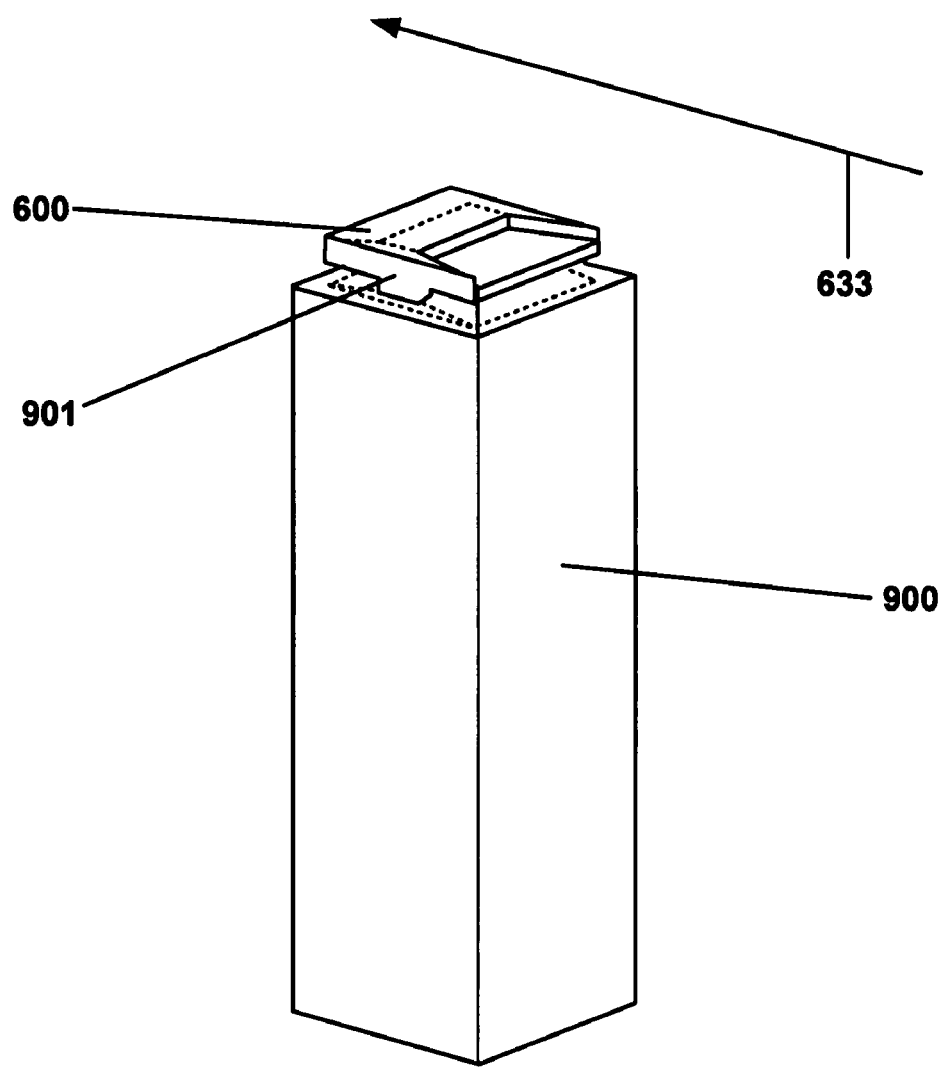
FIG. 9 is a lapping texture element coupled to a lapping element base structure configured with pivotability, in accordance with an embodiment of the present invention.

FIG. 9 is a front angle view of a single element base structure 900 having a pivot coupling element 901 for coupling a lapping texture element 600 thereto, in accordance with an embodiment of the present invention. Pivot coupling element 901 enables element 600 to pivot around the pitch axis in response to lapping pressures. In an alternative embodiment, coupling element 901 can also be configured to allow pitch and roll pivoting thus providing a gimbal function.

In an alternative embodiment, pivot coupling 901 is rotatable, such that element 600 can be moved into an angle of deflection, relative to slider row lapping direction 633.

Pivoting and/or adjustability of the angle of deflection can create a positive pressure effect for those instances when a slider row, e.g., slider row 850 of FIG. 8, is too close to lapping element 600. These functions can also create a negative pressure effect for those instances when slider row 450 is too distant from element 600.

Figure 10:
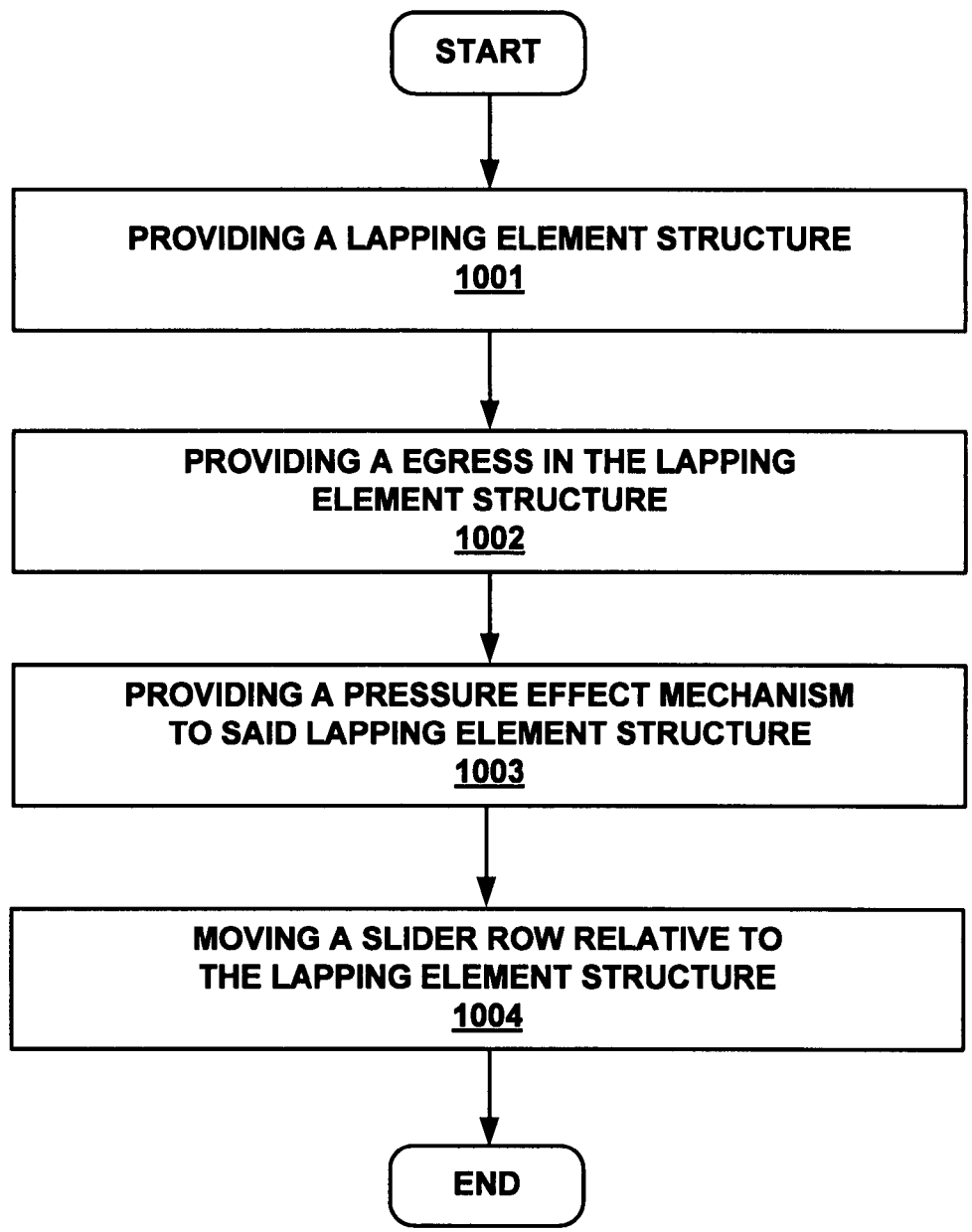
FIG. 10 is a flowchart of a lapping process, in accordance with an embodiment of the present invention.

FIG. 10 is a flowchart of a process 1000 for lapping in accordance with an embodiment of the present invention. FIG. 10 is a flow chart of a process 1000 in which particular steps are performed in accordance with an embodiment of the present invention for fabricating a lapping texture element. Although specific steps are disclosed in process 1000, such steps are exemplary. That is, the present invention is well suited to performing various other steps or variations of the steps recited in FIG. 100. Within the present embodiment, it should be appreciated that the steps of process 100 may be performed by software, by hardware, by an assembly mechanism, through human interaction, or by any combination of software, hardware, assembly mechanism, and human interaction.

Process 1000 will be described with reference to components and devices shown in FIGS. 3, and 6-9.

In step 1001 of process 1000 for lapping, a lapping texture element 600 is provided and includes a lapping element structure, e.g., structure 610 of FIGS. 6-9, in an embodiment of the present invention. One or more additive and/or subtractive photolithographic processes can be implemented in the fabrication of element 600, in an embodiment of the present invention. Structure 610 is shown to include a surface 617 configured with abrasive qualities, as described herein with reference to FIG. 6.

In step 1002 of process 1000, an egress for residue associated with a lapping process is provided, e.g., opening 622, in an embodiment of the present invention, and as described herein with reference to FIGS. 6-9.

In step 1003 of process 1000, a pressure effect associated with a lapping process is provided, e.g., abrasive surface 617 having a higher elevation relative to surface 619, such that a negative pressure area is created during a lapping process, in accordance with an embodiment of the present invention, and as described herein with reference to FIGS. 6-9.

In step 1004 of process 1000, a slider row, e.g., slider row 850 of FIG. 8, is linearly, or moved according to a combination of radially, oscillatory and rotary motion, moved upon lapping element 600, where element 600 is immovably affixed to a lapping element base, e.g., element base 700 or 800, in accordance with an embodiment of the present invention, as described herein with reference to FIGS. 6-8.

In an alternative embodiment, slider row 850 is linearly, or moved according to a combination of radially, oscillatory and rotary motion, moved upon lapping element 600, where element 600 is adjustably affixed to a lapping element base, e.g., element base 900, in accordance with an embodiment of the present invention, and as described herein with reference to FIGS. 6 and 9.

Embodiments of the present invention, in the various presented embodiments, provide a lapping texture element implementable in a lapping system.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A slider lapping texture for implementation in a lapping environment, said slider lapping texture comprising:
    a lapping texture structure for utilization in a lapping process performed on a slider;
    a first surface in said structure, said first surface having a base elevation;
    a second surface for lapping said slider, said second surface at an elevation higher than said base elevation;
    a pivot coupling element coupling said second surface to said first surface, said pivot coupling element allowing said second surface to pivot with respect to said first surface in response to a lapping pressure;
    an opening in said lapping texture structure; and
    wherein said slider lapping texture is configured to generate an attractive force when said slider is substantially unidirectionally motioned thereupon.

2. The slider lapping texture as recited in claim 1 further comprising: an abrasive characteristic, said abrasive characteristic disposed on said second surface.

3. The slider lapping texture as recited in claim 1 further comprising: a directional outlet for removal of residue associated with said lapping process.

4. The slider lapping texture as recited in claim 3 wherein directional outlet is directed in a direction opposite that of said unidirectionally motioned slider.

5. The slider lapping texture as recited in claim 1 wherein said opening provides a pressure effect, said pressure effect achieved during said lapping process.

6. The slider lapping texture as recited in claim 5 wherein said pressure effect is a negative pressure effect, said negative pressure effect attractively affecting said slider.

7. The lapping texture as recited in claim 1 wherein a lithographic process is utilized during fabrication of said lapping texture structure, said lithographic process an additive and/or subtractive lithographic process.

8. A slider lapping system comprising:
    a controlling mechanism for said environment;
    a lapping device for lapping an object and coupled to said controlling mechanism; and
    a slider motion inducing component for directionally motioning said slider relative to said lapping device; and
    a slider retaining device coupled to said slider motion inducing component for retaining said slider in said slider motion inducing component during said directionally motioning said slider relative to said lapping device;
    said lapping device comprising:
        a lapping texture structure;
        a first surface in said structure, said first surface having a base elevation;
        a second surface for lapping said slider, said second surface at an elevation higher than said base elevation,
        a pivot coupling element coupling said second surface to said first surface, said pivot coupling element allowing said second surface to pivot with respect to said first surface in response to a lapping pressure;
        an opening in said lapping texture structure; and
        wherein said slider lapping texture is configured to have said slider substantially unidirectionally motioned thereupon.

9. The lapping system as recited in claim 8 further comprising: an abrasive quality, said abrasive quality disposed on said second surface.

10. The lapping system as recited in claim 8 further comprising: an opening, said opening a directional outlet for removal of residue associated with said lapping process.

11. The lapping system as recited in claim 8 wherein said directional outlet is directed in a direction opposite that of said unidirectionally motioned slider.

12. The lapping system as recited in claim 8 further comprising: a pressure effect, said pressure effect achieved during said lapping process, said pressure effect a result of said second surface having said higher elevation said relative to said first surface.

13. The lapping system as recited in claim 12 wherein said pressure effect is a negative pressure effect.

14. The lapping system as recited in claim 12 wherein said pressure effect is a positive pressure effect.

15. The lapping system as recited in claim 8 wherein said lapping texture structure is adjustably affixed to said lapping device, said lapping device having a lapping texture element base component for retaining said lapping texture structure.

16. A method for a lapping process, said method comprising:

providing a lapping structure, said lapping structure having an abrasive portion at an elevation higher than a base portion;

providing a pivot coupling element, said pivot coupling element coupling said abrasive portion to said base portion, said pivot coupling element allowing said abrasive portion to pivot with respect to said base portion in response to a lapping pressure;

providing an egress in said lapping structure;

providing a pressure effect in said lapping structure, said pressure effect in conjunction with said lapping; and substantially unidirectionally moving an object, upon which said lapping process is applied, relative to said lapping structure.

17. The method as recited in claim 16 wherein said providing an egress further comprises:

configuring said lapping structure such that an opening is present in said lapping structure, said opening providing an outlet for residue associated with said lapping process.

18. The method as recited in claim 16 wherein said providing a pressure effect further comprises;

configuring said lapping structure such that a negative pressure effect is realized during said lapping process.

19. The method as recited in claim 16 wherein said linearly moving said slider row further comprises:

moving said slider row, from a static position, toward said opening of said lapping structure, said lapping structure substantially in a fixed position.

20. The method as recited in claim 16 wherein said linearly moving said slider row further comprises:

moving said slider row, from a static position, toward said opening of said lapping structure, said lapping structure in a moveably fixed position.

* * * * *